United States Patent [19]
Ishikawa et al.

[11] Patent Number: 5,613,193
[45] Date of Patent: Mar. 18, 1997

[54] COMPENSATION OF FREQUENCY OFFSET

[75] Inventors: Hiroyasu Ishikawa; Hideo Kobayashi, both of Saitama, Japan

[73] Assignee: Kokusai Denshin Denwa Co. Ltd., Tokyo, Japan

[21] Appl. No.: 268,437

[22] Filed: Jun. 30, 1994

[30] Foreign Application Priority Data

Jul. 5, 1993 [JP] Japan ................................. 5-190976

[51] Int. Cl.$^6$ .................................................. H04B 7/185
[52] U.S. Cl. ........................ 455/12.1; 455/67.1; 455/70; 342/358; 342/418
[58] Field of Search ...................... 455/12.1, 54.1, 455/56.1, 67.1, 69, 70; 342/358, 402, 405, 418

[56] References Cited

PUBLICATIONS

"Frequency Control of Narrowband Digital Carriers in the Presence of Satellite Döppler and Other Disturbances", Foster et al, Proceedings I•C•D•S•D•9, May 1992, pp. 213–220.

*Primary Examiner*—Andrew Faile
*Attorney, Agent, or Firm*—Nikaido, Marmelstein, Murray & Oram LLP

[57] ABSTRACT

In a satellite mobile communication system in which at least one mobile earth station communicates with a land earth station which is coupled with a network, through a satellite, the land earth station measures frequency offset in a request signal and/or a response signal in a received signal from the mobile earth station due to frequency offset by a transponder in the satellite and/or a local oscillator of said mobile earth station, and doppler shift due to movement of the satellite. The measured frequency offset is forwarded to the mobile earth station through a singalling channel or a communication channel through a satellite. The mobile earth station compensates frequency offset by adjusting oscillation frequency of a local oscillator in the mobile station based upon the measured frequency offset sent from the land earth station.

4 Claims, 9 Drawing Sheets

Fig. 4 PRIOR ART

FREQUENCY OFFSET COMPENSATION BY AFC (C-L LINK)

Fig. 5 PRIOR ART

FREQUENCY OFFSET COMPENSATION BY AFC (L—C LINK)

COMPENSATION OF FREQUENCY OFFSET

BACKGROUND OF THE INVENTION

The present invention relates to a frequency offset compensation system, and in particular relates to such a system in a digital satellite communication system which is used in FDMA (frequency division multiple access) using narrow band modulation signal.

The frequency stability of a local oscillator for a satellite communication system at present is typically in the range from $\pm 1\times 10^{-5}$, to $\pm 1\times 10^{-6}$. In a digital mobile satellite communication system in which C-band (4 GHz band for return link, and 6 GHz band for forward link) is used between a land earth station and a satellite, and L-band (1.5 GHz band for return link and 1.6 GHz band for forward link) is used between a mobile earth station and a satellite are used, considerably large frequency deviation up to 50 kHz–500 kHz occurs both in a C-L link and an L-C link. Further, when an inclination of an orbit of a satellite is large, a doppler shift occurs due to a figure 8-shaped movement of a satellite, and the doppler shift would be 500 Hz when the inclination of the orbit is 5°.

Therefore, a conventional receiver in an earth station has AFC (automatic frequency control) in a C-L link and an L-C link, since it is impossible to directly demodulate a receive signal which is subject to large frequency error, and an adjacent channel interference must be taken into account in an FDMA system.

Figure 4:
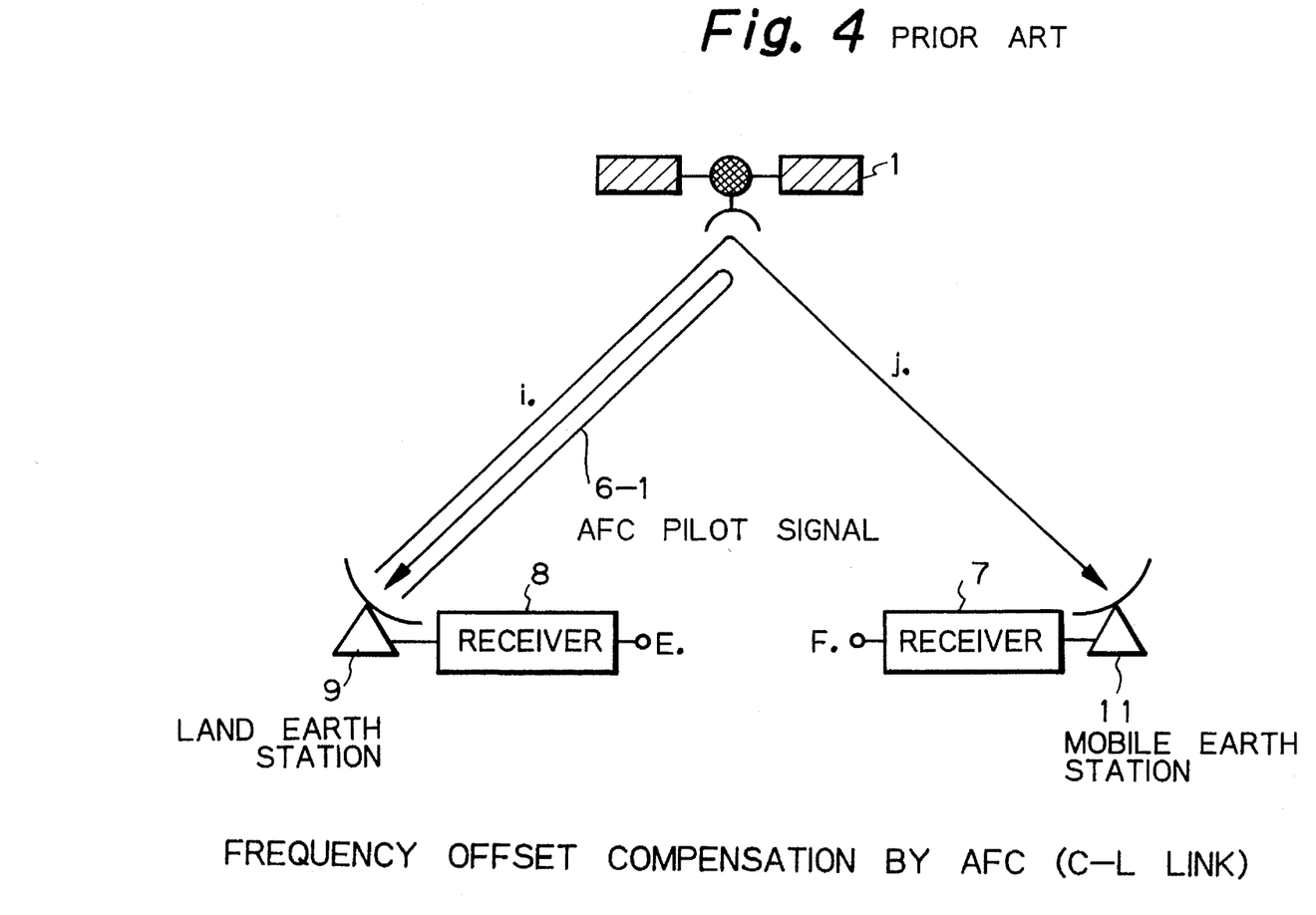
FIG. 4 shows a prior frequency offset compensation system using AFC.
Figure 5:
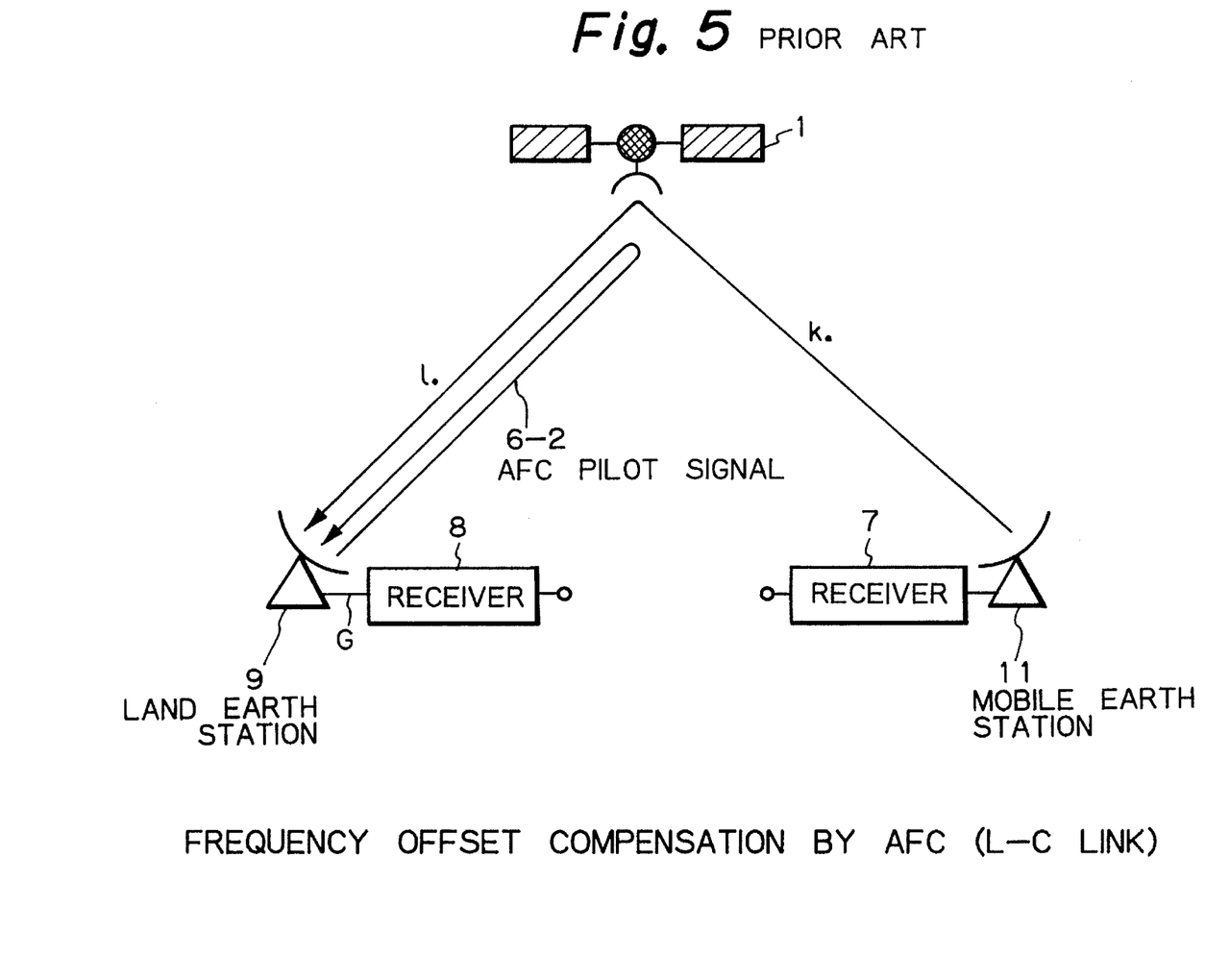
FIG. 5 shows a prior frequency offset compensation system using AFC.

FIGS. 4 and 5 show a conventional mobile satellite communication system using AFC.

FIG. 4 illustrates a configuration used for a conventional C-L link, and has a closed loop control system using an AFC pilot signal 6 (6-1, 6-2) for controlling transmit frequency of a land earth station 9. The AFC pilot signal 6-1 in a C band transmitted by the land earth station 9 is received by the same station 9 in an L band through the frequency conversion in the satellite 1. Then, the received frequency is compared with reference frequency of a pilot signal receiver in the land earth station. The frequency offset is fed back to a local oscillator of a C band frequency converter in the land earth station so that the frequency offset is compensated.

FIG. 5 illustrates a configuration which is used for a conventional L-C link, and has an open loop control system using an AFC pilot signal 6-2 for controlling local frequency in a receiver in a land earth station. An AFC pilot signal in an L band transmitted by the land earth station is received by the same land earth station in a C band through frequency conversion in the satellite 1. Then, the received frequency is compared with reference frequency of a pilot signal receiver in the land earth station. The frequency offset is fed back to a local oscillator of a C band receiver in the land earth station so that the frequency offset is compensated.

However, the amount of doppler shift for AFC pilot signal due to figure 8-shaped movement of a satellite depends upon whether it is a forward link (from a land station 9 to a satellite 1) or a return link (from a satellite 1 to a land station 9). Therefore, it is impossible to separate doppler shift in a forward link from that of a return link. Therefore, communication must be influenced by doppler shift both in a forward link (C-L link) and a return link (L-C link).

Figure 6:
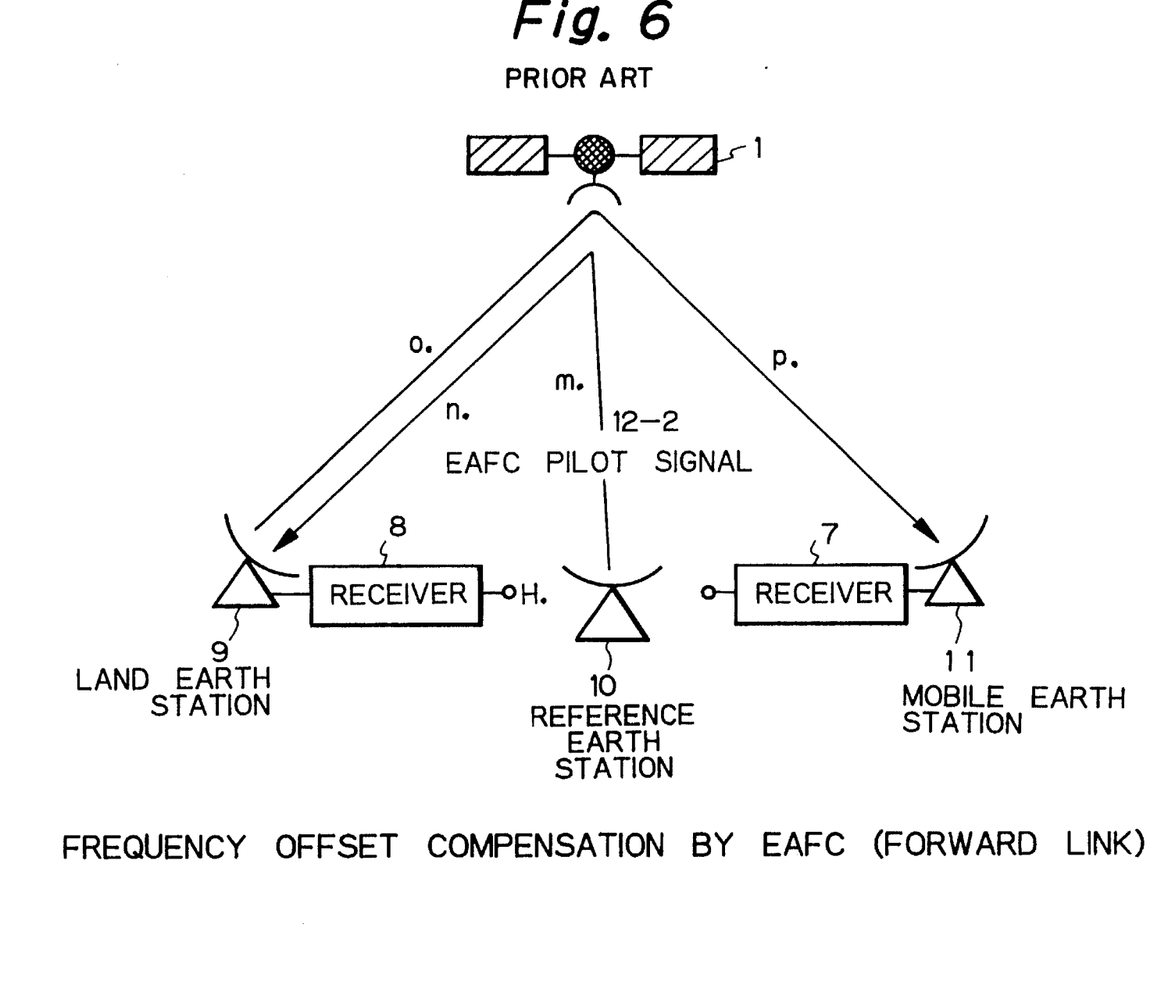
FIG. 6 shows a prior frequency offset compensation system using EAFC.
Figure 7:
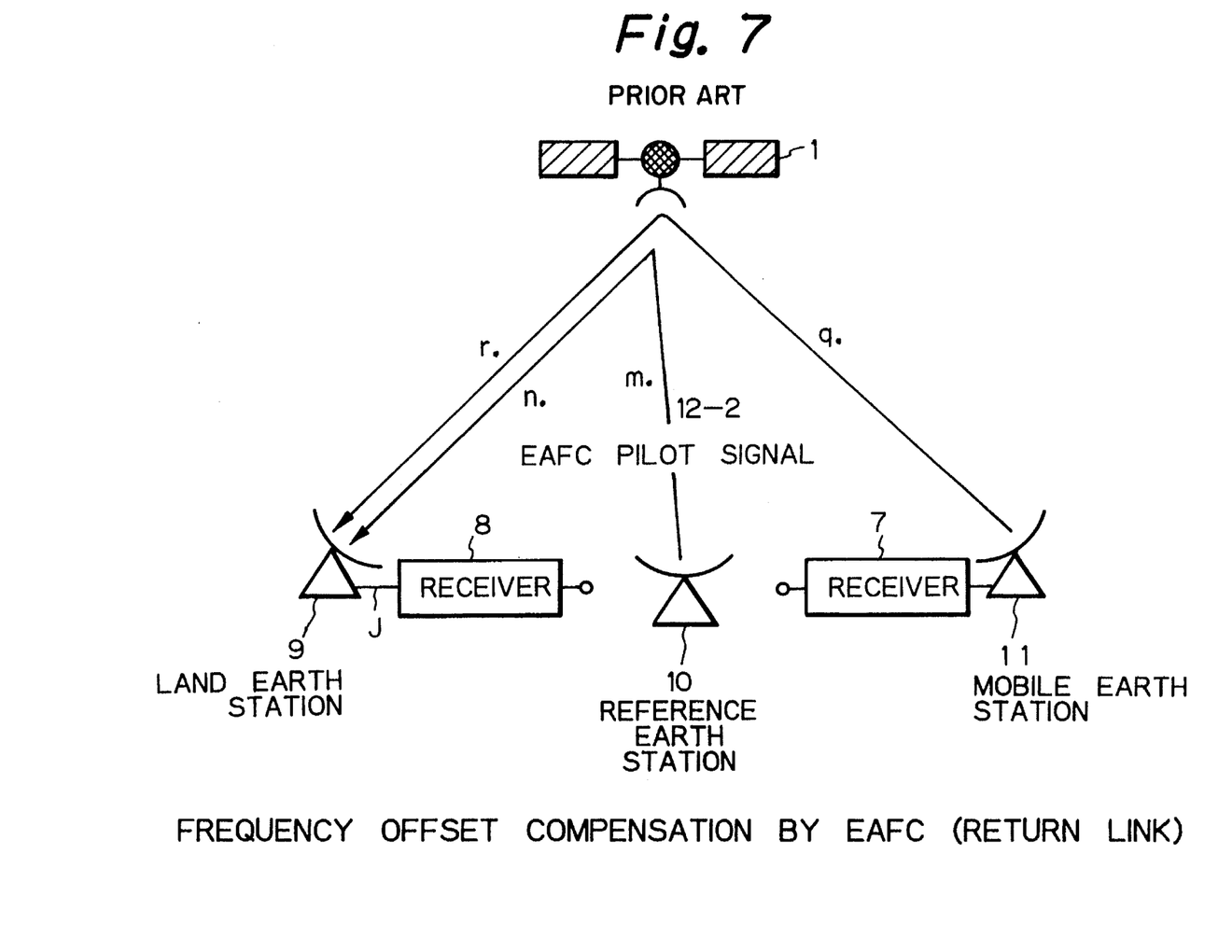
FIG. 7 shows a prior frequency offset compensation system using EAFC.

In order to solve the above problem, an EAFC (Enhanced AFC) has been proposed in a paper entitled "Frequency Control of Narrowband Digital Carriers in the Presence of Satellite Doppler and Other Disturbances", in proceedings in 9th international conference on digital satellite communications, pages 213–220, May 18–22, 1992, organized by INTELSAT. The EAFC system is shown in FIGS. 6 and 7. The EAFC installs a reference earth station 10 separated from a land earth station 9, for providing a pilot signal (12-1, 12-2). The reference earth station 10 estimates an amount of doppler shift based upon location information of a land earth station and a reference earth station, orbit information of a satellite, and received data of pilot signal for 24 hours, so that the amount of doppler shift in communication channel between a land earth station and a satellite is compensated. The control for EAFC pilot signal for a forward link is carried out independent from that for a return link, since frequency in a forward link differs from frequency in a return link. So, EAFC pilot signal 12-1 is controlled so that doppler shift in a return link from a satellite to a land earth station is compensated, and EAFC pilot signal 12-2 is controlled so that doppler shift in a forward link from a land earth station to a satellite is compensated.

However, the EAFC system has the disadvantage that only the doppler shift between a satellite and a land earth station, but the doppler shift between a satellite and a mobile earth station is not compensated. Therefore, the doppler error up to 500–600 Hz exists in spite of the EAFC.

Typically oscillator in a land earth station has long term stability of around $\pm 1\times 10^{-8}$. However, an oscillator in a mobile station typically has a long term stability around $\pm 1\times 10^{-5}$. Therefore, signal quality of the receive signal in a mobile station is significantly deteriorated due to frequency shift which is caused by unstability of an oscillator in a mobile station. In order to solve that problem, conventionally, a mobile station takes a frequency offset compensation system by synchronizing a transmit frequency of the mobile station with a forward link receive signal frequency transmitted from a land earth station.

However, even when such a frequency offset compensation system is used with the combination of said AFC system or said EAFC system, it has the disadvantage that a land earth station must demodulate a receive signal which has significant frequency error generated in both a forward link and a return link between a satellite and a land earth station, and doppler shift between a satellite and a mobile station. This causes significant difficulty to a land earth station, and complicates the structure of the land earth station.

Further, in an FDMA system in which a modulation signal is in the narrow band, signal quality is deteriorated due to adjacent channel interference, since frequency offset compensation error of AFC or EAFC in each channel differs from a frequency offset due to doppler shift between a satellite and a mobile station.

No suitable solution for compensating that adjacent channel interference has been proposed. Therefore, a current digital mobile satellite communication system requires wide guard band between channels. However, these systems have the disadvantage that the efficiency of frequency use in a transponder in a satellite is significantly decreased.

Therefore, it has been a goal to develop a frequency offset compensation system wherein efficiency of frequency use in a transponder in a satellite is increased.

SUMMARY OF THE INVENTION

It is an object, therefore, of the present invention to overcome the disadvantages and limitations of the prior frequency offset compensation system by providing a new and improved frequency offset compensation system for satellite mobile communication system.

It is also an object of the present invention to provide a frequency offset compensation system for satellite mobile communication system, in which guard band between channels in a transponder on a satellite may be reduced so that frequency efficiency in communication is improved.

It is also an object of the present invention to provide frequency offset compensation system for satellite mobile communication system, in which structure of a land earth station is simplified.

It is also an object of the present invention to provide a frequency offset compensation system for satellite mobile communication system, wherein frequency offset between a satellite and a mobile earth station is also compensated.

The above and other objects are attained by a frequency offset compensation system in a satellite mobile communication system including a plurality of land earth stations each coupled with a terrestrial network and said satellite through a radio link, a reference earth station coupled with said satellite through a radio link to monitor and control said land earth stations, and at least one mobile earth station coupled with said satellite through a radio link. The system includes means installed in said land earth station for measuring frequency offset in request signal or response signal in received signal from said mobile earth station through said satellite through a radio link due to frequency offset by a transponder in said satellite and a local oscillator in said mobile earth station, and for measuring frequency offset due to doppler shift by movement of said satellite. The system also includes means for informing the frequency offset thus measured to said mobile earth station which transmits said request signal or said response signal through a signalling channel or a communication channel through a radio link through said satellite, and means installed in said mobile earth station for controlling local frequency for a communication channel based upon frequency offset informed by said land earth station so that said frequency offset thus measured becomes the minimum.

BRIEF DESCRIPTION OF THE DRAWINGS

The foregoing and other objects, features, and attendant advantages will be appreciated by means of the following description and accompanying drawings, wherein.

DESCRIPTION OF THE PREFERRED EMBODIMENTS

Figure 1:
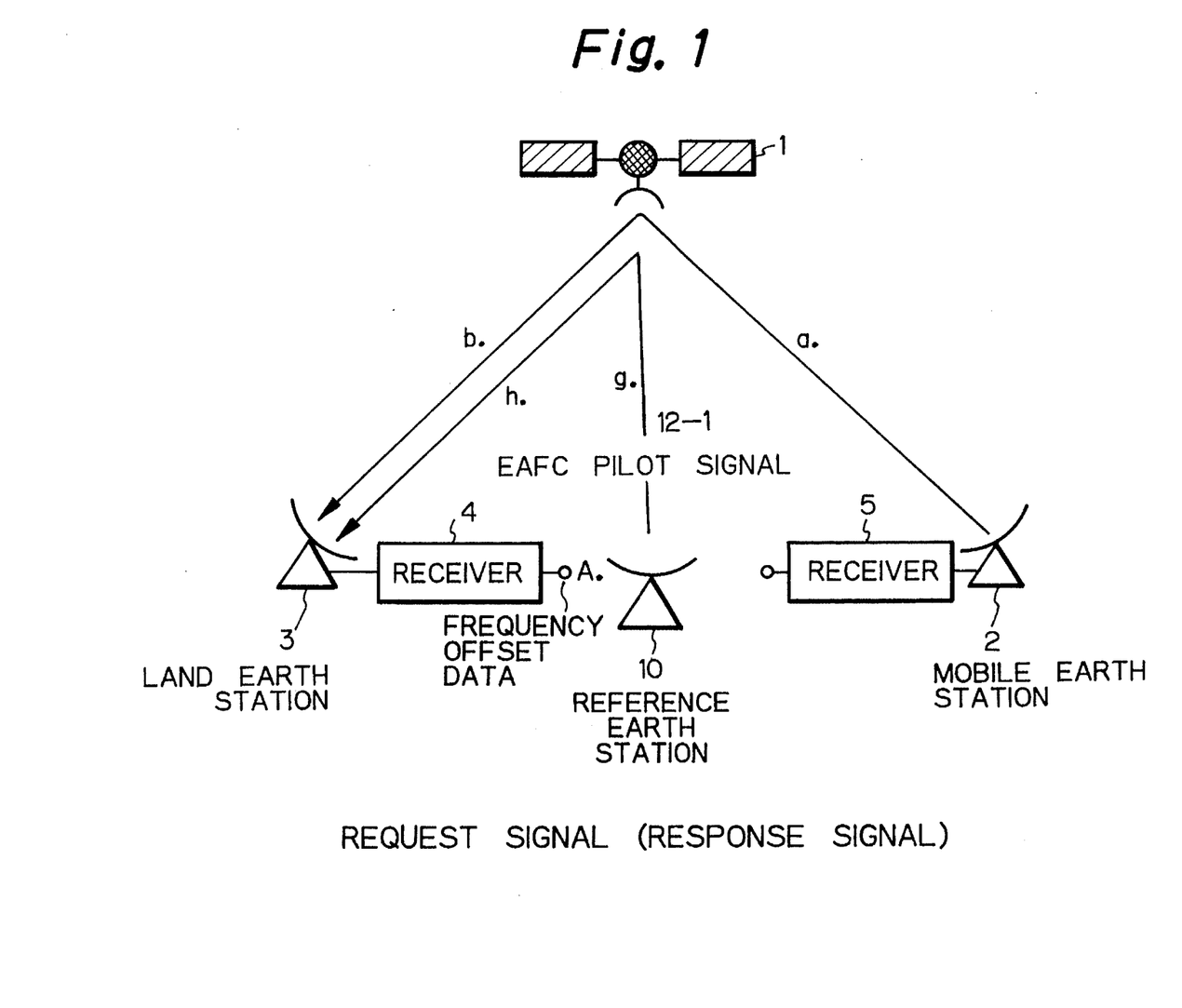
FIG. 1 shows frequency offset compensation system for a mobile station according to the present invention.
Figure 2:
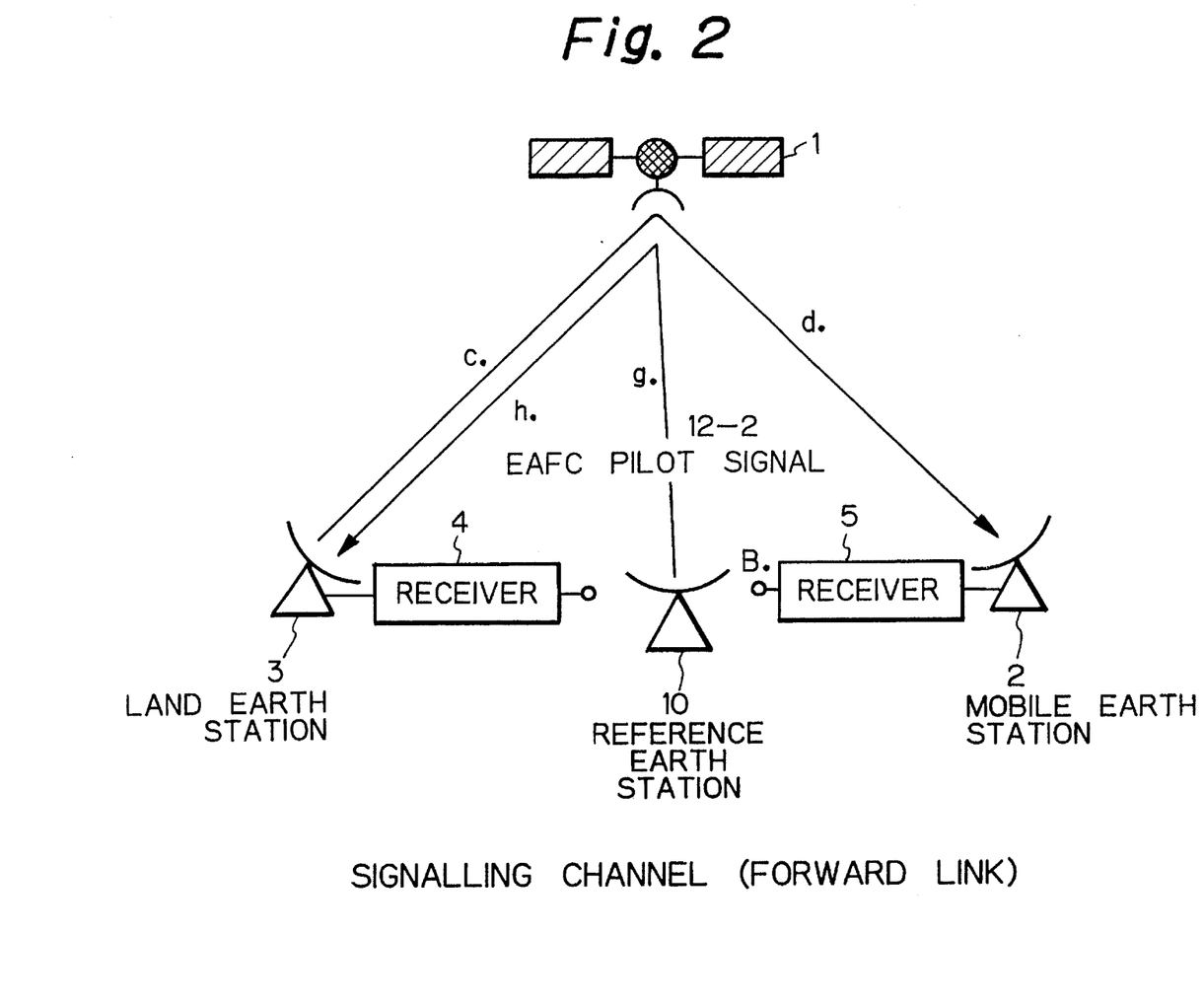
FIG. 2 shows frequency offset compensation system for a mobile station according to the present invention.
Figure 3:
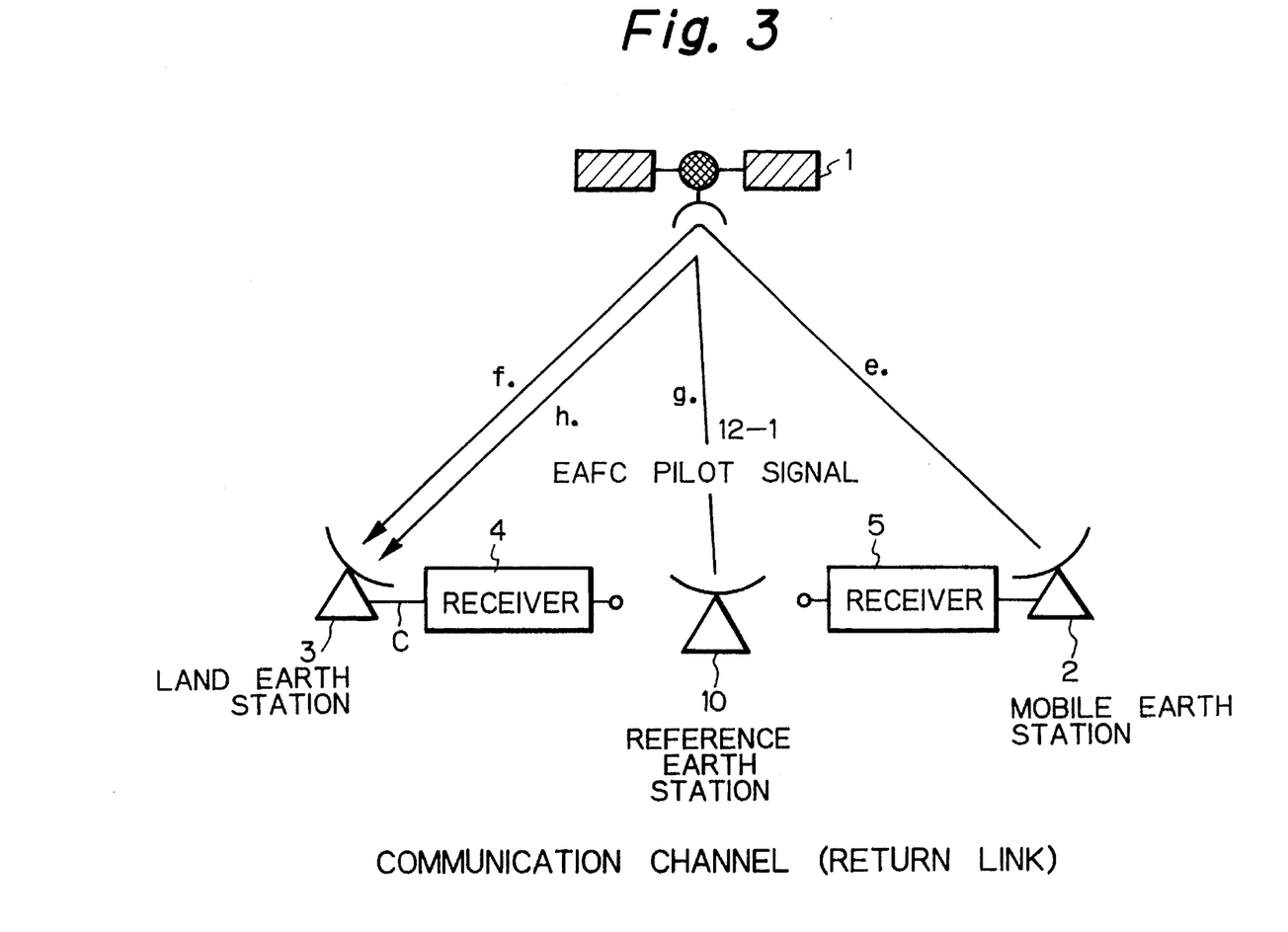
FIG. 3 shows frequency offset compensation system for a mobile station according to the present invention.

FIGS. 1 through 3 show a mobile satellite communication system according to the present invention.

In FIG. 1, a mobile earth station 2 sends a fixed earth station 3 a request signal for requesting assignment of a communication channel, and/or response signals (a) and (b) for call request from a terrestrial network, so that a mobile station 2 communicates with a land earth network. It is assumed that a transponder in a satellite 1 has sufficient bandwidth for the request signal considering frequency offset due to unstability of a local oscillator which is associated with mobile station 2.

The present invention considers only a return link (L-C link). As for a forward link (C-L link), it is assumed that frequency offset compensation is carried out by an EAFC system in which an EAFC pilot signal 12-2 sent by a reference earth station 10 is used. It is also assumed that a local oscillator of land earth station 3 is considerably stable as compared with that of a mobile earth station 2, and therefore, frequency offset in a forward link by a local oscillator in a land earth station 3 is negligibly small.

A land earth station 3 receives a request signal and/or response signals (a) and (b) from a mobile earth station 2. Those received signals are demodulated in a receiver 4. A high precision carrier frequency detector (not shown) in the receiver 4 detects frequency offset A after the frequency offset compensation by the EAFC signal included in the receive signal. The estimation of the frequency offset A is shown in JP patent laid open publication 108835/1989.

The frequency offset A thus detected is packed into a data frame, which is forwarded to a mobile earth station 2 through signalling channels (c) and (d) together with communication channel assignment signal, as shown in FIG. 2.

The receiver 5 in the mobile earth station 2 demodulates the receive signal from the land earth station 3, and recognizes the amount of the frequency offset which the mobile earth station 2 must compensate. The mobile earth station 2 adjusts frequency of the local oscillator which belongs to the mobile earth station 2 based upon said amount of the frequency offset, so that the frequency offset in the return link (L-C link) (e) and (f) in FIG. 3.

It is assumed in an oscillator in a mobile earth station that a short term frequency stability is considerably better than that of a long term frequency stability, and therefore, carrier frequency of a communication channel is almost constant in each communication time which is usually less than five minutes.

Next, the theoretical analysis of improvement of frequency offset in a return link (L-C) link is described, together with other cases (case 1, case 2 and case 3) for comparison purposes. In case 1, no frequency compensation is carried out. In case 2, only frequency offset by AFC is carried out. In case 3, only frequency offset by EAFC is carried out.

First, elements of reason of frequency offset in each link will be enumerated.

a) Frequency deviation of a local oscillator included in a pilot signal in AFC; OSC(AFC).
b) Compensation error by AFC; COM(AFC).
c) Frequency deviation of a local oscillator in a satellite; OSC(SAT).
d) Frequency deviation of a local oscillator in a land earth station (LES); OSC(LES).
e) Frequency error of a frequency converter in a land earth station (LES); CONV(LES).
f) Frequency deviation of a local oscillator in a mobile earth station (MES); OSC(MES).
g) Frequency error of a frequency converter in a mobile earth station (MES); CONV(MES).

h) Estimation error of frequency offset in a receiver in a land earth station; OSC(DEMO).
i) Doppler shift due to movement of a satellite between a mobile station and a satellite;
UP link; $D_{up}$(MES)
DOWN link; $D_{down}$(MES)
j) Doppler shift due to movement of a mobile earth station between a mobile earth station and a satellite
UP link; $DP_{up}(t)$
DOWN link; $DP_{down}(t)$
Those factors are changing in accordance with time.
k) Doppler shift due to movement of a satellite between a satellite and a land earth station
UP link; $D_{up}$(LES)
DOWN link; $D_{down}$(LES)

By using the above parameters, frequency offset in each link is shown below, where the symbols a through r, and A through J coincide with those in FIGS. 1 through 7:
(1) Detection of frequency offset in a request signal and/or a response signal from a mobile earth station in L-C link.

Frequency offset $\Delta f_b$ in transmit signal from a mobile earth station at an input point (a-b link) of a receiver 4 of a fixed earth station is as follows:

$$\begin{aligned}\Delta f_b &= D_{down}(LES) + OSC(SAT) + D_{up}(MES) + \\ &\quad OSC(MES) + CONV(MES) + DP_{up}(t=T_1)\end{aligned}$$

The frequency offset compensation $\Delta f_{down}$(EAFC) by EAFC (g-h link) in this case is as follows:

$$\Delta f_{down}(EAFC) = COM(AFC) + OSC(SAT) + OSC(AFC) + D_{down}(LES)$$

Therefore, the frequency offset $\Delta fA$ at the output A of the receiver of the land earth station is:

$$\begin{aligned}\Delta fA &= \Delta f_b + OSC(DEMO) - \Delta F(EAFC) \\ &= D_{up}(MES) + OSC(MES) + CONV(MES) + \\ &\quad DP_{up}(t=T_1) + OSC(DEMO) - COM(AFC) - \\ &\quad OSC(AFC)\end{aligned}$$

(2) Advice of frequency offset from a land earth station to a mobile earth station through a signalling channel (C-L link).

The value $\Delta fA$ measured in the step (1) is packed in a data frame as frequency offset compensation data, and is forwarded from a land earth station to a mobile earth station through a control channel C-L (c-d), as shown in FIG. 2.

(3) Error of frequency offset compensation included in transmit signal transmitted by a mobile station, after frequency offset compensation in communication channel (L-C link).

The frequency offset $\Delta ff$ included in signal transmitted by a mobile earth station at input point (e-f link) of the receiver 4 in a land earth station is:

$$\begin{aligned}\Delta ff &= D_{up}(MES) + OSC(MES) + CONV(MES) + \\ &\quad DP_{up}(t=T_2) + D_{down}(LES) + OSC(SAT)\end{aligned}$$

Since the frequency offset compensation $\Delta f_{down}$(EAFC) by EAFC(g-h link) is given by the step (1), the error $\Delta fc$ of frequency offset compensation error at input point C of a receiver 4 in a land earth station is:

$$\begin{aligned}\Delta fc &= \Delta ff - \Delta f_{down}(EAFC) \\ &= DP_{up}(t=T_2) - DP_{up}(t=T_1) + \\ &\quad OSC(DEMO) \\ &\Leftarrow |DP_{up}(t=T_1) + DP_{up}(t=T_2)|\end{aligned}$$

$DP_{up}$(t=$T_2$) is not always coincide with $DP_{up}$(t=$T_1$), since a mobile earth station changes always in moving direction and moving velocity.

Frequency offset $\Delta f_c(1)$ in L-C link when no frequency offset compensation is carried out (case 1) is as follows:

$$\begin{aligned}\Delta f_c(1) &= D_{down}(LES) + OSC(SAT) + D_{up}(MES) + \\ &\quad OSC(MES) + CONV(MES) + DP_{up}(t)\end{aligned}$$

Similarly, as for AFC and EAFC, frequency offset in L-C channel (communication channel) is analyzed as follows:
(4) Error of frequency offset compensation by AFC(case 2) in C-L link (see FIG. 4)

Frequency offset compensation $\Delta f$(AFC) by AFC pilot signal is:

$$\begin{aligned}\Delta f(AFC) &= D_{up}(LES) + OSC(SAT) + D_{down}(LES) + \\ &\quad OSC(AFC) + COM(AFC)\end{aligned}$$

Therefore, frequency offset $\Delta fF$ included in signal transmitted by a land earth station at output point F of a receiver in a mobile earth station is:

$$\begin{aligned}\Delta fF &= D_{up}(LES) + CONV(LES) + OSC(SAT) + \\ &\quad D_{down}(MES) + DP_{down}(t) - \Delta f(AFC) \\ &= CONV(LES) + D_{down}(MES) + DP_{down}(t) - \\ &\quad D_{down}(LES) - OSC(AFC) - COM(AFC)\end{aligned}$$

(5) Error of frequency offset compensation by AFC(case 2) in L-C link (see FIG. 5).

Frequency offset $\Delta fG$ in signal transmitted by a mobile earth station at input point G of a receiver of a land earth station is shown as follows by using $\Delta fF$ and $\Delta f$(AFC) obtained in the step (4):

$$\begin{aligned}\Delta fG &= \Delta fF + D_{up}(MES) + DP_{up}(t) + CONV(MES) + \\ &\quad OSC(SAT) + D_{down}(LES) - \Delta f(AFC) \\ &= CONV(LES) + D_{down}(MES) + DP_{down}(t) + \\ &\quad CONV(MES) - D_{down}(LES) - 2OSC(AFC) - \\ &\quad 2COM(AFC) + D_{up}(MES) + DP_{up}(t) - \\ &\quad D_{up}(LES)\end{aligned}$$

(6) Error of frequency offset compensation by EAFC (case 3) in C-L link (see FIG. 6)

As previously shown, error of frequency offset compensation $\Delta f_{up}$(EAFC) of EAFC pilot signal (m-n link) is as follows:

$$\Delta f_{up}(EAFC) = COM(AFC) + OSC(SAT) + OSC(AFC) + D_{up}(LES)$$

Therefore, frequency offset $\Delta fI$ in signal transmitted by a land earth station at output point I of a receiver of a mobile earth station (o-p link) is:

$$\Delta fI = D_{up}(LES) + CONV(LES) + OSC(SAT) +$$
$$D_{down}(MES) + DP_{down}(t) - \Delta f_{up}(EAFC)$$
$$= CONV(LES) + D_{down}(MES) \, DP_{down}(t) -$$
$$COM(AFC) - OSC(AFC)$$

(7) Error of frequency offset by EAFC(case 3) in L-C link (see FIG. 7).

Frequency offset $\Delta fJ$ in signal transmitted by a mobile earth station at input point J of a receiver of a fixed earth station is shown below, by using $\Delta fI$ and $\Delta f_{down}$(EAFC) obtained in the step (6):

$$\Delta fJ = \Delta fI + D_{up}(MES) + DP_{up}(MES) +$$
$$CONV(MES) + OSC(SAT) + D_{down}(LES) +$$
$$OSC(LES) - \Delta f_{down}(EAFC)$$
$$= CONV(LES) + D_{down}(MES) + DP_{down}(t) -$$
$$2COM(AFC) - 2OSC(AFC) + D_{up}(MES) +$$
$$DP_{up}(t) + CONV(MES)$$

In the above analysis, $\Delta fC$, $\Delta fG$ and $\Delta fJ$ show total error of frequency offset compensation in a signal received by a land earth station, when AFC and EAFC are used in a mobile communication system using a satellite according to the present invention.

The typical numerical examples of elements which cause frequency offset in satellite mobile communication system are shown below.

| | | |
|---|---|---|
| | OSC(AFC) | ±100 Hz |
| | COM(AFC) | ±100 Hz |
| | OSC(SAT) | ±50 kHz |
| | OSC(LES) | ±100 Hz |
| | CONV(LES) | ±100 Hz |
| | OSC(MES) | ±5 kHz |
| | CONV(MES) | ±100 Hz |
| | OSC(DEMO) | ±20 Hz |
| | $D_{up}$ (MES) | ±243 Hz |
| | $D_{down}$ (MES) | ±228 Hz |
| | $DP_{up}$ (t) | ±160 Hz |
| | $DP_{down}$ (t) | ±150 Hz |
| | $D_{up}$ (LES) | ±288 Hz |
| | $D_{down}$ (LES) | ±177 Hz |

The calculated result of $\Delta fC$, $\Delta fG$, $\Delta fJ$ and $\Delta fC(1)$ by using the above typical parameters is as follows, where result is sum of absolute values of each error which may be either positive or negative.

a) Case 1 where no frequency offset compensation is used;

$$\Delta fC(1)=55,680 \, kHz$$

b) Case 2 where frequency offset compensation by AFC is used;

$$\Delta fG=0.966 \times 1.6/1.5 + 0.88 \, kHz = 1.91 \, kHz$$

c) Case 3 where frequency offset compensation by EAFC is used;

$$\Delta fJ=0.678 \times 1.6/1.5 + 0.703 \, kHz = 1.426 \, kHz$$

d) Case 4 where frequency offset compensation of the present invention is used;

$$\Delta fC=0.34 \, kHz$$

As apparent in the above analysis, the present invention considerably improves frequency offset. The improvement by the present invention is 1/163.8 as compared with the case 1 which has no compensation, 1/5.6 as compared with the case 2 which uses prior AFC systen, 1/4.2 as compared with the case 3 which uses prior EAFC system. In other words, the present invention removes the affection by all the frequency offset completely, except that by doppler shift between a satellite and a mobile earth station due to movement of the mobile earth station. Therefore, the present invention provides excellent signal quality with no specific demodulator for compensating frequency offset.

The above description describes the total frequency offset in a communication channel at an input of a demodulator of a land earth station.

Further, we must consider adjacent channel interference in a radio link in a satellite mobile communication system. When a plurality of land earth stations and a plurality of mobile earth station communicate with each other independently from one another, undesirable adjacent channel interference can occur between adjacent channels in a radio link, due to doppler shift ($D_{up}$(LES), $D_{down}$(LES), $D_{up}$(MES) and $D_{down}$(MES)) due to movement of a satellite between a land earth station and a mobile earth station, doppler shift due to movement of a mobile earth station between a mobile station and a satellite ($DP_{up}$(t), $DP_{down}$(t)), frequency deviation OSC(LES) frequency error (CONV(LES)), error of frequency offset compensation (COM(AFC)) of a local oscillator of a receiver in a land earth station, and frequency deviation (OSC(MES)) and frequency error (CONV(MES)) of a local oscillator of a receiver in a mobile earth station, all differ from each other.

It is denoted that ASIF is frequency offset which causes adjacent channel interference at an input of a satellite transponder in the C-L channel, ASIR is frequency offset which causes adjacent channel interference at an input of a satellite transponder in the L-C channel, then, frequency offset which causes adjacent channel interference is as follows for each case of compensation:

Case 1 (no compensation for frequency offset)

$$\Delta ASIR(1)=OSC(MES)+D_{up}(MES)+DP_{up}(MES)$$

Case 2 (compensation with AFC)

$$\Delta ASIF(2) = CONV(LES) + COM(AFC) + D_{up}(LES)$$
$$\Delta ASIR(2) = CONV(LES) + COM(AFC) +$$
$$D_{up}(LES) + D_{down}(MES) + DP_{down}(t) +$$
$$CONV(MES) + D_{up}(MES) + DP_{up}(t)$$

Case 3 (compensation with EAFC)

$$\Delta ADIF(3) = CONV(LES) + COM(AFC)$$
$$\Delta ASIR(3) = CONV(LES) + COM(AFC) +$$
$$D_{up}(MES) + D_{down}(MES) + DP_{down}(t) +$$
$$DP_{up}(t) + CONV(MES)$$

Present invention $$\Delta ASIF = CONV(LES) + COM(AFC)$$
$$\Delta ASIR = OSC(DEMO) + 2DP_{up}(t) + CONV(MES)$$

The numerical amount of cross channel interference in each case using said typical parameters is as follows:

| | |
|---|---|
| ΔΔSIR(1) | 5.403 kHz |
| ΔΔSIF(2) | 0.488 kHz |
| ΔΔSIR(2) | 1.427 kHz |
| ΔΔSIF(3) | 0.2 kHz |
| ΔΔSIR(3) | 1.12 kHz |
| ΔΔSIF | 0.2 kHz |
| ΔΔSIR | 0.44 kHz |

It should be appreciated that the present invention considerably improves the adjacent channel interference in a satellite. The amount of the improvement is 1/2 as compared with the case 1 which uses no compensation, 1/3 as compared with the case 2 which uses AFC, and 1/2.5 as compared with the case 3 which uses EAFC.

Therefore, the present invention improves the use of frequency band of a satellite transponder by reducing bandwidth for guard band, while the prior art must have wide guard band between communication channels in order to eliminate intersymbol interference due to adjacent channel interference.

Now, the structure and operation of the present invention will be described in accordance with FIGS. 1 through 3, FIG. 8 and FIG. 9.

In FIG. 1, a mobile earth station 2 which may be a vehicle, a vessel, and/or an airplane, transmits a request signal for requesting assignment of a communication channel, and/or a response signal for answering call request from a terrestrial network, to a satellite 1 through L band (forward link (a)), and a satellite 1 receives the request signal, and/or the response signal, which are up-converted to C band, and are transmitted to a land earth station 3 through C band (return link (c)).

Then, land earth station 3 receives the request signal (and/or the response signal) from the mobile earth station 2 through the satellite 1 through C band, demodulates the request signal in a receiver 4 so that frequency offset A in a receive signal which is also compensated by EAFC (or AFC) is measured with high precision.

Figure 8:
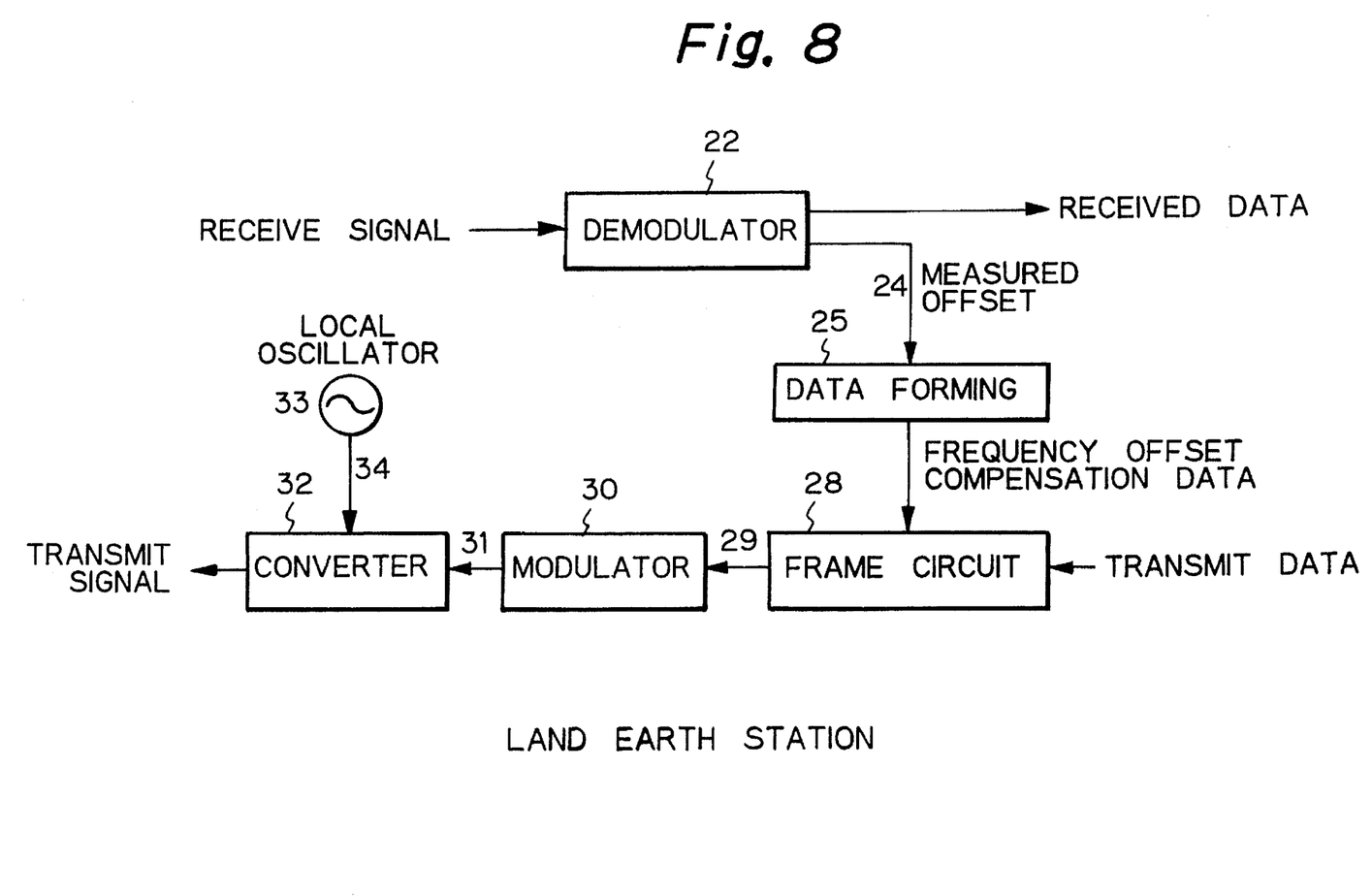
FIG. 8 shows a block diagram of a land earth station according to the present invention.

FIG. 8 is a block diagram of a tranceiver in a land earth station. In FIG. 8, numeral 22 denotes a demodulator for demodulating receive signal 21 from a satellite, numeral 25 is a data forming circuit for forming a data based upon measured frequency offset 24 derived from the demodulator 25 and providing compensation data 26, numeral 28 is a transmit data framing circuit for composing a data frame from the compensation data and a series of transmit data 27, numeral 30 is a modulator for modulating transmit data signal which is output of the transmit data framing circuit 28, numeral 32 is a frequency converter for converting frequency of modulation signal 31, and numeral 33 is a local oscillator for generating local frequency 34 for providing transmit signal 35 through the frequency converter 32.

In FIG. 8, receive signal 21 from a mobile earth station through a satellite includes some undesired frequency offset which is not completely removed by a prior EAFC and/or a prior AFC. The frequency offset in the receive signal is measured with high precision (with error less than ±20 Hz) in the demodulator 22. The measurement of error of carrier frequency is shown in JP patent laid open publication 108835/1989.

The measured value 24 of the frequency offset is applied to the data forming circuit 25 which provides the frequency offset compensation data 26 to the transmit data frame circuit 28. The transmit data frame circuit 28 packs the frequency offset data, together with a series of transmit data 27 which includes assignment information of a communication channel in a data frame in a TDM frame format, and forwards the TDM frame signal 29 thus packed to the modulator 30, which provides the TDM modulation signal in baseband. The TDM baseband signal 31 is applied to the frequency converter 32 which converts the TDM baseband signal to high frequency according to the local frequency 34 supplied by the local oscillator 33. The high frequency signal 35 which is the output of the frequency converter 32 is forwarded to mobile earth station 2 through satellite 1 (see FIG. 2) through a signalling channel c (C band) and a signalling channel d(L band).

A receiver 5 in mobile earth station 2 receives a control signal from land earth station 3 through a satellite 1, and demodulates the received signal so that the value of the frequency offset A which is subject to compensation in the station is recognized.

Figure 9:
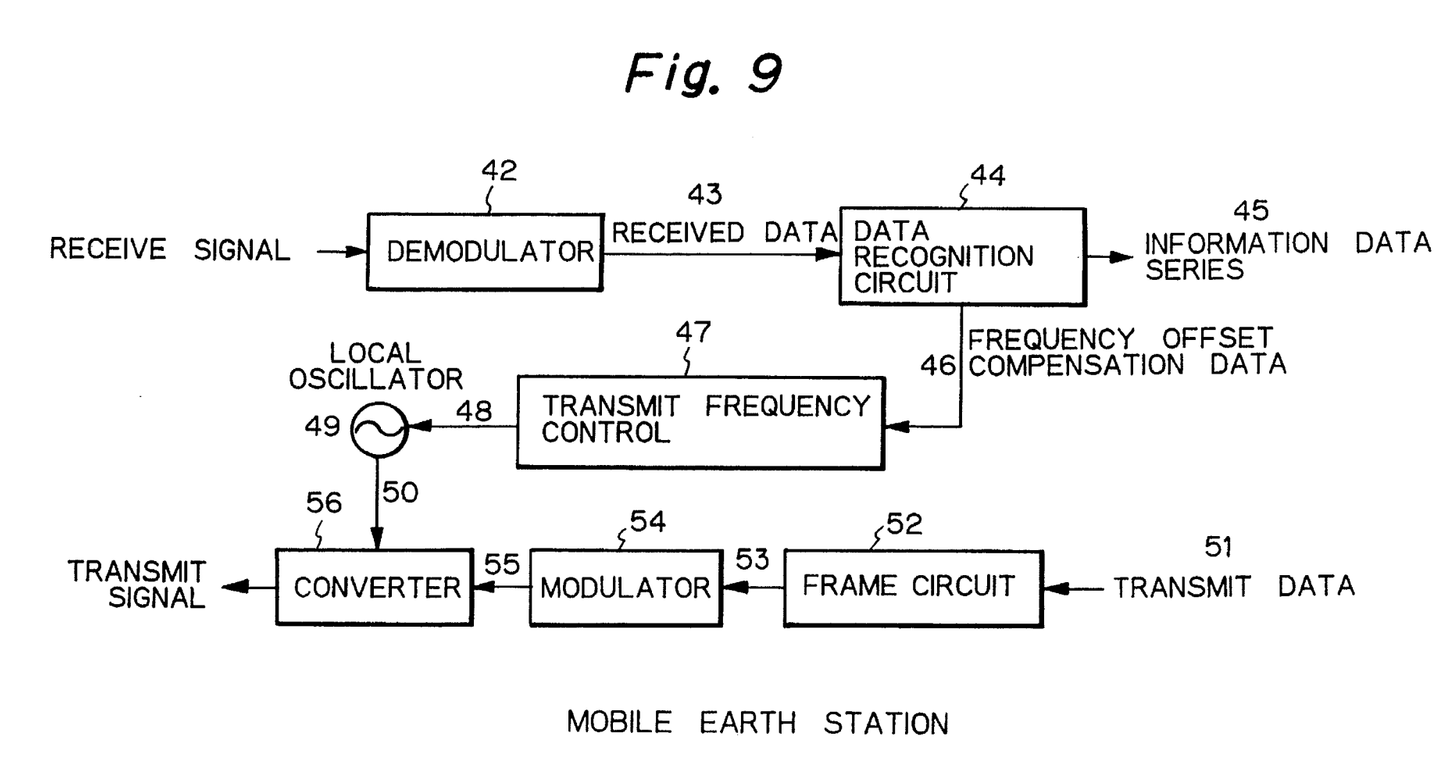
FIG. 9 shows a block diagram of a mobile earth station according to the present invention.

FIG. 9 shows a block diagram of a tranceiver in a mobile earth station. In the figure, numeral 42 denotes a demodulator for demodulating a received signal 41 from a satellite, numeral 44 is a data recognition circuit 44 for recognizing a demodulated receive signal which is output of the demodulator 42, numeral 47 is a transmit frequency control for controlling a local oscillator 49 according to frequency offset compensation data 46 which is output of the data recognition circuit 44, numeral 52 is a transmit data frame circuit for packing a series of transmit data into a frame, numeral 54 is a modulator for modulating a framed transmit data which is output of the circuit 52, and numeral 56 is a frequency converter for converting modulated signal 55 which is output of the modulator 54 by using the local frequency 50 which is output of the local oscillator 49.

In FIG. 9, it is assumed that a receive signal 41 from land earth station 3 through satellite 1 in FIG. 2 is preliminary compensated by a prior EAFC or a prior AFC, and therefore, said receive signal 41 can be received by receiver 5 of mobile earth station 2 with no problem, and the demodulator 42 can demodulate the received signal 41.

The demodulated receive signal 43 is recognized in the data recognition circuit 44 which provides an information data series 45 and frequency offset compensation data 46. The latter data 46 is applied to the transmit frequency control 47, which controls the local frequency oscillator 49 through the control line 48 so that the frequency offset becomes the minimum by shifting the oscillation frequency of the local oscillator 49.

The TDM baseband modulation signal 55 provided through the modulator 54 and the transmit data framing circuit 52 is converted to high frequency by using the local frequency 50 which is controlled to compensate the frequency offset. The transmit signal 57 of the output of the frequency converter 56 is forwarded to a land earth station through a satellite 1.

As described above in detail, according to the present invention, a land earth station measures frequency offset in a received signal from a satellite in a return path, measured frequency offset is transmitted to a mobile earth station through a satellite communication channel, and the mobile earth station adjusts local frequency based upon the frequency offset informed by the land earth station so that the frequency offset becomes the minimum.

Therefore, the frequency offset compensation is carried out without complicating a receiver in a land earth station, and high quality communication through a satellite is obtained, frequency efficiency in a satellite transponder is improved, and adjacent channel interference in a satellite transponder is removed.

The present invention is useful in miniaturizing, reducing consuming power, and reducing cost of a mobile terminal device. Therefore, a user of a satellite mobile communication system may obtain efficient, high quality communication service.

From the foregoing it will now be apparent that a new and improved frequency offset compensation system has been developed. It should be understood, of course, that the embodiments disclosed are merely illustrative and are not intended to limit the scope of the invention. Reference should be made to the appended claims therefore for indicating the scope of the invention.

What is claimed is:

1. Frequency offset compensation system in a satellite mobile communication system including a plurality of land earth stations each coupled with a terrestrial network and a satellite through a first radio link, a reference earth station coupled with said satellite through a second radio link to monitor and control said land earth stations, and at least one mobile earth station coupled with said satellite through a third radio link, said system comprising:

means installed in a land earth station of the plurality of land earth stations for measuring a first frequency offset in a request signal or a response signal in a received signal from said mobile earth station through said satellite through the third radio link due to a second frequency offset by a transponder in said satellite and a local oscillator in said mobile earth station, and third frequency offset due to doppler shift by movement of said satellite, means for informing the first frequency offset thus measured to said mobile earth station which transmits said request signal or said response signal through a communication channel through the third radio link through said satellite, means installed in said mobile earth station for controlling local frequency for the communication channel based upon said first frequency offset informed by said land earth station so that said first frequency offset thus measured becomes a minimum.

2. Frequency offset compensation system in a satellite mobile communication system according to claim 1, wherein said land earth station is provided with means for AFC in which said land earth station forwards an AFC pilot signal to said satellite, and receives said pilot signal which is subject to said first frequency offset, and compensates said first frequency offset by controlling a local frequency for a transmitter and a receiver in said land earth station.

3. Frequency offset compensation system in a satellite mobile communication system according to claim 1, wherein a reference earth station is provided for transmitting an EAFC pilot signal which includes an estimated frequency offset to said satellite, said estimated frequency offset corresponding to said first frequency offset and said land earth station receives said EAFC pilot signal through said satellite and controls local frequency of said land earth station for a transmitter and a receiver based upon said received EAFC pilot signal.

4. Frequency offset compensation system in a satellite mobile communication system according to claim 1, wherein said means for informing the measured first frequency offset from said land earth station to said mobile earth station forwards a value of said first frequency offset in digital form by packing said value into a frame for the communication channel.

* * * * *